Oct. 23, 1945.   G. R. DEMPSTER   2,387,500
TRANSPORTING AND DUMPING EQUIPMENT
Filed Oct. 1, 1943   3 Sheets-Sheet 1

Inventor
George R. Dempster
By Cameron, Kerkam & Sutton
Attorneys

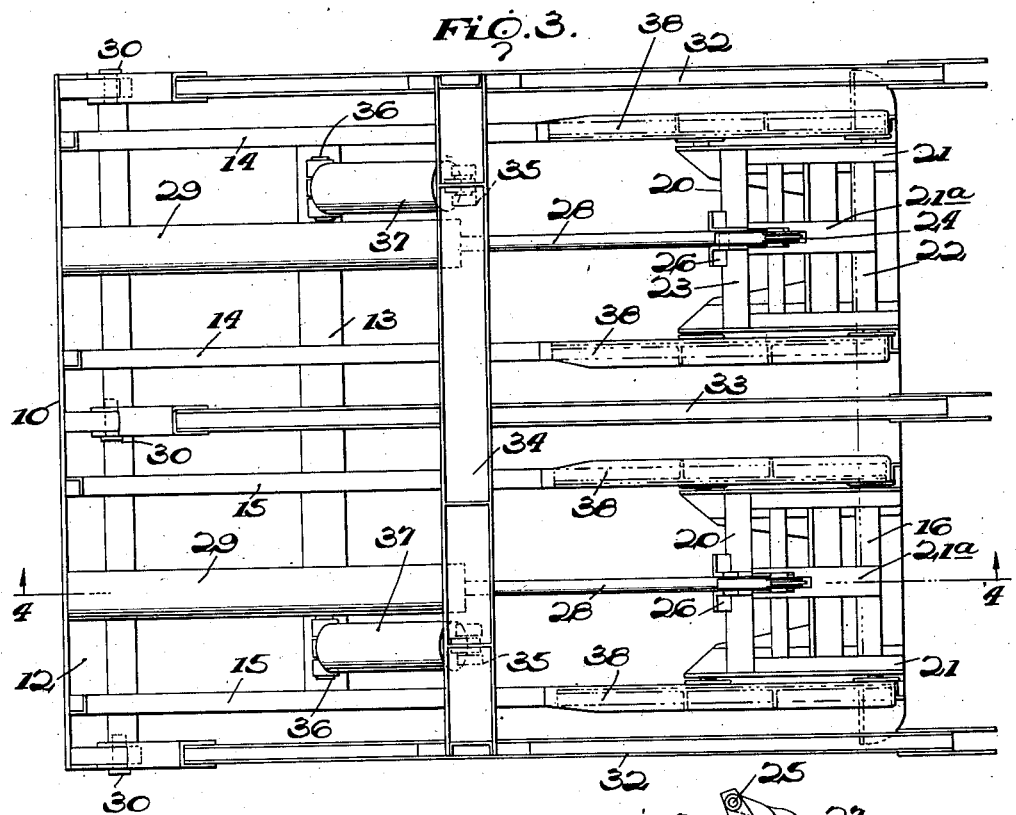
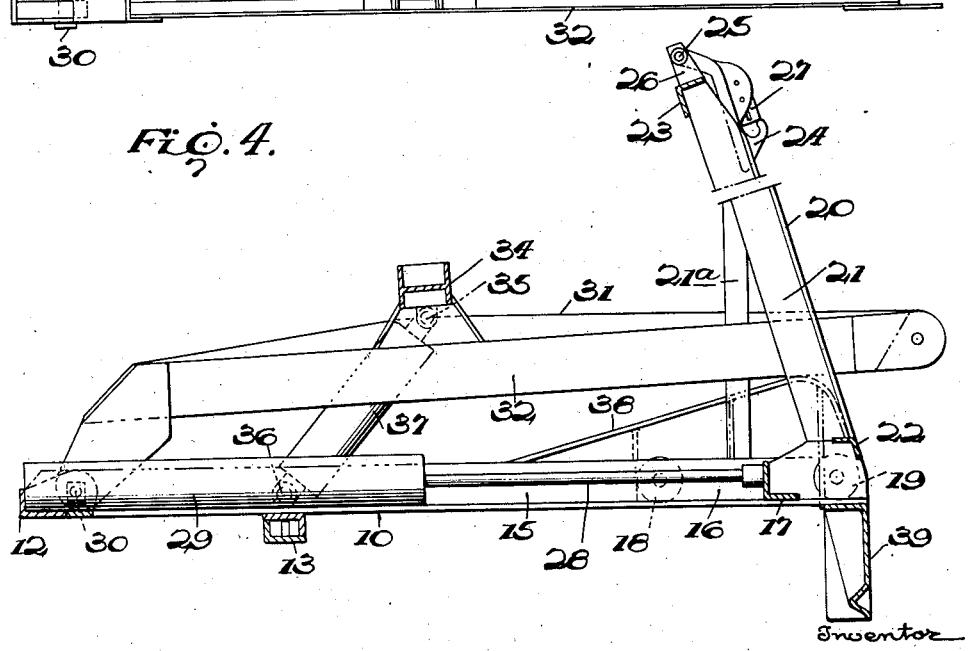

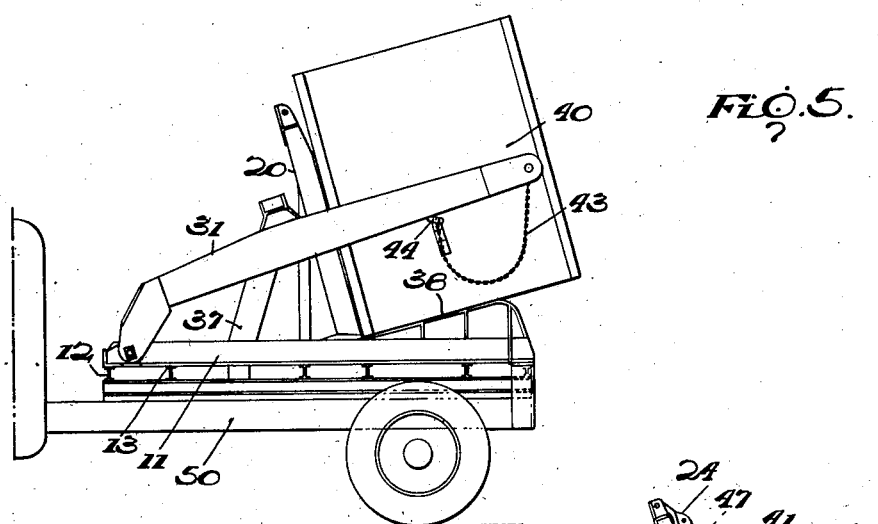
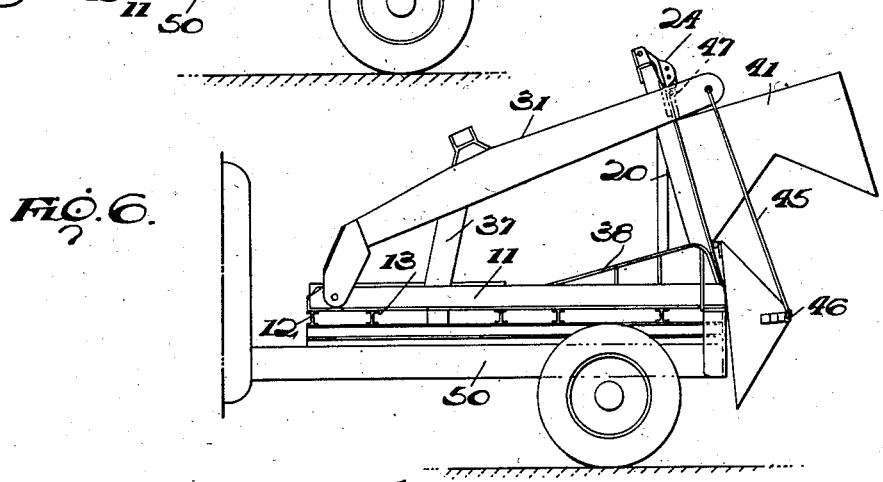
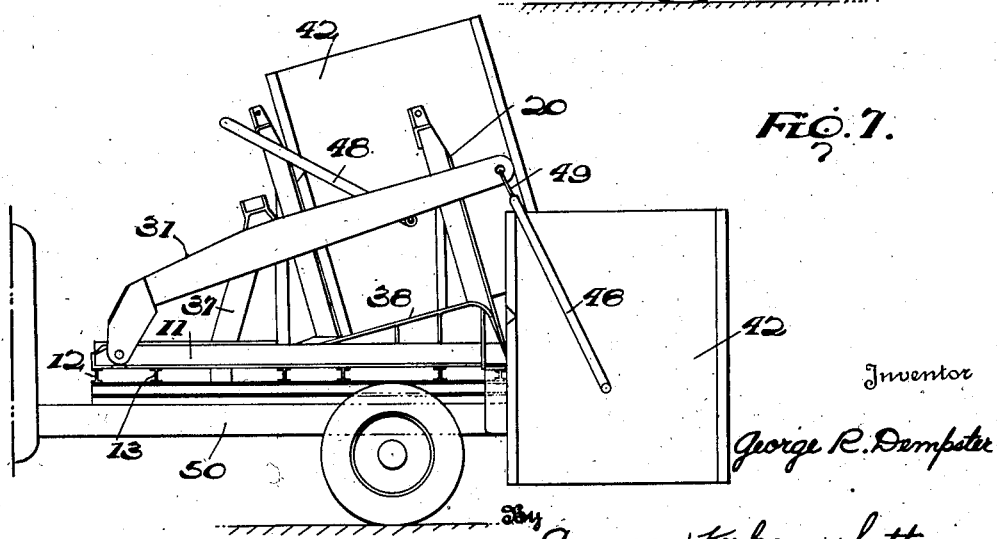

Patented Oct. 23, 1945

2,387,500

UNITED STATES PATENT OFFICE 2,387,500

TRANSPORTING AND DUMPING EQUIPMENT

George R. Dempster, Knoxville, Tenn.

Application October 1, 1943, Serial No. 504,620

20 Claims. (Cl. 214—77)

This invention relates to transporting and dumping equipment, and more particularly to transporting and dumping equipment whereby a plurality of transporting and dumping containers may be transported and dumped individually or in unison.

It has heretofore been proposed in my Patent No. 2,305,148, granted December 15, 1942, to provide transporting and dumping equipment by which a plurality of containers may be successively disposed on a truck body for transportation and successively dumped or deposited therefrom, the arrangement being such that the containers when mounted on the truck body are disposed in a fore and aft tandem relationship. While excellently serving the intended purpose, equipment of this character is sometimes open to the objection that access to the first container mounted on the truck body is desired before access to a subsequently mounted container is necessary, and in that event, such equipment involves the inconvenience that the subsequently mounted container may have to be removed from the truck body in order to gain the desired access to the earlier mounted container.

It is an object of this invention to provide improved transporting and dumping equipment which can handle a plurality of containers either separately or in unison without the foregoing inconvenience.

Another object of this invention is to provide improved equipment of the type characterized whereby a plurality of containers may be disposed on a truck body for simultaneous transportation under such conditions that access may be gained to each independently of the other when desired.

Another object of this invention is to provide improved equipment of the type characterized which may be conveniently manipulated so as to handle either one or a plurality of containers as desired.

Another object of this invention is to provide improved equipment of the type characterized which in handling a plurality of containers may manipulate them separately or together.

Another object of this invention is to provide improved equipment of the type characterized by which either one or more containers may be transported in a load forward position and either one or more of such containers may be dumped or deposited from a rearward position either independently or in unison.

Another object of this invention is to provide improved equipment of the type characterized which if desired can handle at the same or different times different forms of containers.

Another object of this invention is to provide improved equipment of the type characterized which is flexible in service and highly efficient in operation as well as strong, durable and readily controlled.

Other objects of the invention will appear as the description of the invention thereof proceeds.

The invention is capable of receiving a variety of mechanical expressions, some of which are illustrated on the accompanying drawings, but it is to be expressly understood that the drawings are for purposes of illustration only, and are not to be constructed as definitions of the limits of the invention, reference being had to the appended claims for that purpose.

Referring in detail to the drawings, wherein the same reference characters are employed to designate corresponding parts in the several figures:

Fig. 3 is a plan view of said equipment;

Fig. 4 is a section on the line 4—4 of Fig. 3; and

Figs. 5, 6 and 7 are elevational views to a reduced scale illustrating equipment embodying the present invention mounted on a truck body and showing the same handling containers of different forms.

Referring first to the embodiment of Figs. 1 to 4, the transporting and dumping equipment is shown as comprising a framework 10 of any suitable construction and shown as including longitudinal side members 11 and end members 12 with appropriate intermediate bracing and strengthening members 13 to give adequate rigidity and strength to the framework, said frame being adapted to be mounted on and secured to any suitable truck chassis as shown in Figs. 5 to 7 and as well understood in the art. Said framework 10 may be built up of any suitable elements as channels, I beams, angle irons, etc.

Figure 2:
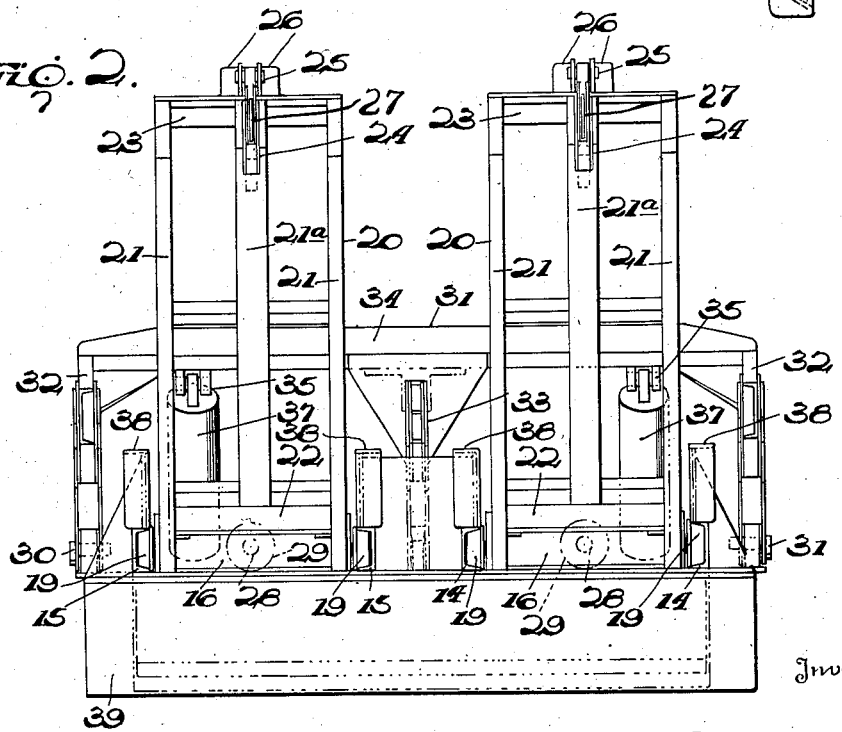
Fig. 2 is an end elevation of said equipment.

Suitably mounted on or formed by said framework are two pairs of tracks 14 and 15 respectively. If preferred, the side members 11 may be used as one track of each pair, but as shown said track members are provided separately. The two pairs of tracks are preferably disposed symmetrically with respect to the longitudinal center line of the frame, with each pair of tracks having its own longitudinal center line approximately bisecting the distance from the center line of the frame to a side member thereof. Said track members may be of any suitable construction, being shown as in the form of channel members, the channel members of each pair being faced inwardly as shown in Fig. 2.

Mounted for longitudinal movement on each pair of tracks is a carriage 16. As each carriage is preferably of the same construction the description of one will be sufficient. Each carriage is composed of a base or frame 17 carrying at or adjacent its fore and aft extremities suitable pairs of rollers 18 and 19 adapted to run on or in the tracks provided by the channels 14 and 15. Rigidly mounted on each carriage is a skid frame 20 extending upwardly therefrom and preferably inclined forwardly so that the weight of a container being moved thereon is in part sustained thereby. Said skid frame may be of any suitable construction and formed of any suitable elements, being shown as in the form of an open rectangular frame composed of side members 21, a transverse base member 22 and a transverse cross bar 23, and suitably braced by a strut 21a. Suitably mounted on each transverse cross bar 23 is any suitable automatic dumping hook such as disclosed for example in my Patent No. 2,121,121, granted June 21, 1938 or my copending application Serial No. 484,636, filed April 26, 1943. As shown, said hook comprises a hook-shaped member 24 pivoted at 25 on lugs 26 and carrying a slidable masking plate 27, said hook being operable by a bail on a container for engagement with the bail to suspend the container from the skid frame or for disengagement of the bail to release the container in a maner well understood in the art.

Each carriage has rigidly attached to a transverse portion of its frame 17 the rear end of a piston rod 28 that is connected to a piston movable in a cylinder 29 fixedly carried by the frame 10. Each cylinder 29 is provided with suitable fluid connections and valves (not shown), as disclosed for example in my Patent No. 2,197,779, granted November 14, 1939, whereby hydraulic power may be admitted to the forward end of the cylinder to move the piston and rod 28 and carriage 16 rearwardly, or by admitting fluid power to the rearward end of the cylinder or by merely releasing the hydraulic pressure at the forward side of the piston when a load engages the skid frame tending to move it forwardly, the carriage may be moved forwardly. Each of the cylinders 29 has its individual system of communicating conduits and valve control so that the cylinders 29 may be operated either separately or together for the purpose of moving either or both of the carriages 16 with their associated skid frames 20 either rearwardly or forwardly as the case may be.

Pivotally mounted at the forward end of the frame as by pivot pins 30 is a boom structure 31 of any suitable construction and shown as comprising side arms 32 respectively disposed laterally outside of the carriages 16, and by preference an intermediate arm 33 disposed equidistantly between the two carriages 16. The boom structure with its side and intermediate arms is shown as united into a rigid structure by a transverse member 34 rigidly secured to each of said arms and of any suitable construction to provide the desired rigidity and strength for said boom structure. Pivotally connected to said transverse member 34 at 35 and to the frame 10 at 36 are one or more pistons and cylinders 37 for raising and lowering said boom structure. As here shown, two pistons and cylinders are symmetrically arranged with respect to the fore and aft axis of the frame, but if preferred a single centrally arranged piston and cylinder could be employed. Said pistons and cylinders are suitably provided with fluid connections and valve controls (not shown) so that by introduction of fluid pressure thereto and release of fluid pressure therefrom the boom structure may be raised and lowered with respect to the frame in a manner well understood in the art.

Suitably mounted on the frame at the rear end thereof and in symmetrical relationship with the two pairs of tracks 14 and 15, and here shown as carried by the channel irons which constitute said tracks, are pairs of supporting plates 38 having forwardly and downwardly inclined upper surfaces to receive and support containers when the containers are elevated onto the skid frames and moved forwardly with the carriages 16. Thus each container in transporting position is supported on forwardly inclined surfaces which are preferably at right angles to the inclined operative faces of the skid frames so that during transportation rearward movement of the containers is opposed. The arms 32 and 33 of the boom structure are preferably so spaced transversely that when lowered to the position shown in Fig. 1 they embrace the containers on the supports 38 and thereby prevent transverse displacement of the containers. Owing to the forward inclination of the supports 38 the containers will not move rearwardly with respect to the frame, while the boom arms prevent lateral displacement, and stability of the load is thus assured.

Depending from the rear end of the frame 10 is an apron 39 of any suitable construction to provide a wear-resisting surface up and down which the containers are adapted to slide when being moved onto and off of the skid frames. Said apron 39 and also the skid frames 20 may be provided with antifriction means in the form of rollers to facilitate the relative movement of the containers with respect thereto, but I prefer to mount the rollers on the forward faces of the containers.

The containers used with the equipment as so far described may be of any suitable construction, that is, they may be containers adapted to be tilted to dumping position, as shown for example in my Patent No. 2,281,183, granted April 28, 1942, or they may be generally rectangular or cylindrical containers of any suitable construction as shown at 40 in Fig. 5, or they may be bottom-dump containers as shown at 41 in Fig. 6 in which case they may be of any suitable construction such as disclosed in my Patent No. 2,162,839, granted June 20, 1939, or they may be bail supported, generally rectangular or cylindrical containers of any suitable construction as shown at 42 in Fig. 7. Depending upon the type of container construction to be used with the equipment, the boom structure heretofore described is provided with suitable means for attachment to the containers so that they may be lifted onto or deposited from the frame. In the construction of Fig. 5 the boom arms 32 and 33 are provided with two pairs of chains 43 adapted to be detachably connected to lugs or pins 44 of any suitable construction provided at the sides of the container. If the containers are of the tilt type or bottom-dump type as heretofore referred to the boom arms 32 and 33 are provided with two pairs of chains or cables 45 adapted to be attached to pins 46 provided on the containers so that when the bails 47 are engaged with the automatic hooks 24 as heretofore referred to the containers may be tilted or the bottoms released for dumping as disclosed in my patents heretofore identified and diagrammatically illustrated as to the bottom-dump type of construction in Fig. 6. If the containers are of the type carrying a pivoted bail 48 as shown in Fig. 7, the boom arms 32 and 33 may be provided with any suitable short lengths of chains 49 with or without hooks or other suitable attachments for engagement with each bail 48. If the type of container shown in Figs. 5 and 7 is alone to be used the automatic hooks may be omitted from the skid frames but by preference automatic hooks are provided so that the equipment is adapted to handle more than one type of container. By providing long lengths of chains on the boom arms the equipment is equipped to handle the tilt type and bottom-dump types of container as well as the type of container shown in Fig. 5, and if short lengths of chain are also provided the type of container shown in Fig. 7 may be used. Similarly, the equipment may be provided with suitable means for handling any other appropriate form of container. In fact, if the middle boom arm is omitted or removable the equipment is capable of handling a single container of the full width of the frame by joint and simultaneous operation of the two carriages 16.

Figure 1:
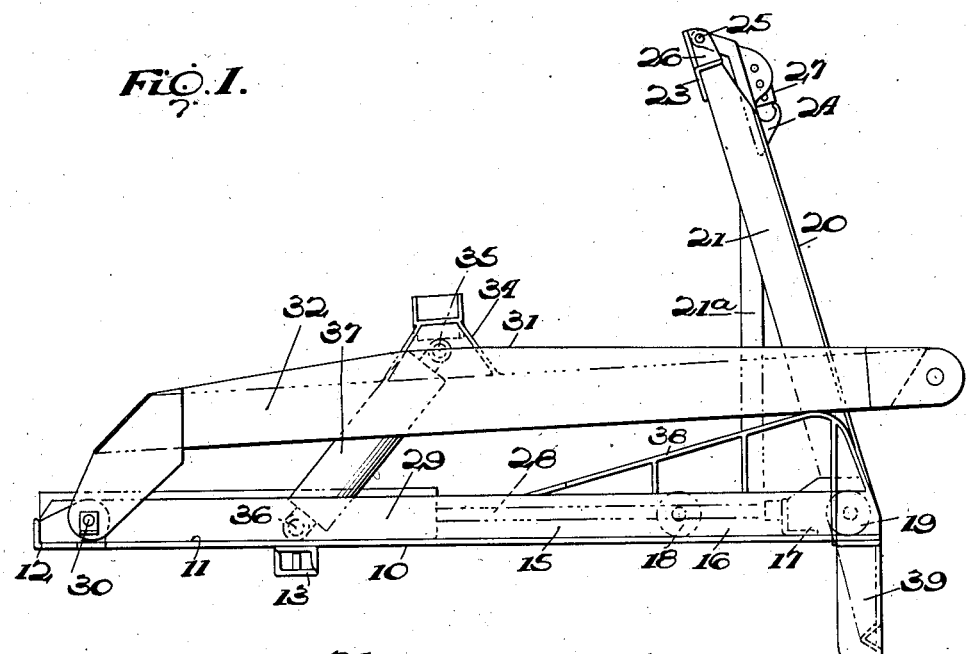
Fig. 1 is a side elevation of transporting and dumping equipment embodying the present invention.

The equipment as so far described and as shown in Figs. 5, 6 and 7 is adapted to be mounted on the chassis 50 of any suitable truck with the supports 38 preferably arranged approximately over the rear axle. The truck can be backed up to any suitable container, and assuming that the carriage 16 has been moved by its piston and cylinder 29 to its rearmost position as shown in Fig. 1 and that the boom structure 31 has been lowered by its pistons and cylinders 37 as also shown in Fig. 1, the container may be attached by its suitable provision to one of the boom arms 32 and the boom arm 33. If hydraulic power is now admitted to the pistons and cylinders 37 the boom structure 31 is elevated, raising the container along the apron 39 and then along the forwardly-inclined skid frame 21 until its bottom is higher than the supports 38. By manipulation of the hydraulic mechanism 29 the carriage 16 may be moved forwardly, this action preferably taking place by releasing the liquid from the forward side of the cylinder because the action of the load on the skid frame is sufficient to move the carriage 16 and its skid frame forwardly. When the container is above the supports 38, the hydraulic mechanism 37 is manipulated to lower the container onto the supports 38.

By like operation a like or unlike container may be lifted and deposited on the other pair of supports 38 after it has been drawn up along the other skidway 20. Thereupon the boom structure may be lowered to the position shown in Fig. 1 for preventing lateral displacement of the containers on the supports 38. The containers may now be readily transported to any desired point and by manipulation of the hydraulic mechanism 37 either or both of the containers may be lifted off their supports 38 and then, by manipulation of the hydraulic mechanism 29, the elevated container or containers may be moved rearwardly by movement of the carriage or carriages 16 until the container or containers are in position for dumping or deposit on the ground, an action effected by manipulating the hydraulic mechanism 37 so as to lower the containers to the ground or to effect the tipping or bottom-dumping of the containers if such is desired.

It will be observed that by reason of the present invention either of the containers is equally accessible because each of the carriages 16 with its skidway 20 is operable independently of the other. Thus each of the containers is independently movable into its forward position for transportation and independently movable into its rearward position for deposit or dumping. Therefore, it is unnecessary at any time to remove one container in order to gain access to another. At the same time the apparatus is highly flexible in service because of the variety of containers that can be handled and the ease and facility with which the containers may be separately and individually lifted onto and dumped or deposited from the frame. The equipment is strong and durable, provides stability during the transportation of the loads, and is readily manipulatable for handling different types of containers in different ways.

While the embodiments of the invention illustrated on the drawings have been described with considerable particularity, it is to be expressly understood that the invention is not restricted thereto as the same is capable of receiving a variety of mechanical expressions as will now be apparent to those skilled in the art, other forms of containers than here illustrated may be used, changes may be made in the details of construction and arrangement of the various parts of the framework, carriages, skidways, boom structure, etc., and any suitable provisions can be made for supplying hydraulic pressure to the hydraulic mechanism and for severally controlling the same selectively, all without departing from the spirit of the present invention. Reference is therefore to be had to the claims hereto appended for a definition of said invention.

What is claimed is:

1. In a transporting and dumping equipment adapted to be mounted on a truck chassis, the combination of a frame providing a plurality of tracks in side by side relationship, a plurality of carriages mounted on said tracks and movable forwardly and rearwardly thereon, each of said carriages being provided with a skidway, power mechanism individual to each carriage for selectively moving the carriages forwardly and rearwardly, and a power operated boom structure for selectively lifting containers into cooperative relationship with said skidways.

2. In a transporting and dumping equipment adapted to be mounted on a truck chassis, the combination of a frame providing a plurality of tracks in side by side relationship, a plurality of carriages mounted on said tracks and movable forwardly and rearwardly thereon, each of said carriages being provided with a skidway, power mechanism individual to each carriage for selectively moving the carriages forwardly and rearwardly, and a power operated boom structure for selectively lifting containers into cooperative relationship with said skidways, said boom structure comprising side arms and at least one intermediate arm adapted to embrace the containers when disposed on said frame.

3. In a transporting and dumping equipment adapted to be mounted on a truck chassis, the combination of a frame providing a plurality of tracks in side by side relationship, a plurality of carriages mounted on said tracks and movable forwardly and rearwardly thereon, each of said carriages being provided with a skidway, power mechanism individual to each carriage for selectively moving the carriages forwardly and rearwardly, and a single power operated boom structure for selectively lifting containers into cooperative relationship with said skidways, each of said carriages with its associated skidway being movable forwardly of the frame to a position wherein a container on the skidway may be deposited for support entirely by said frame.

4. In a transporting and dumping equipment adapted to be mounted on a truck chassis, the combination of a frame providing a plurality of tracks in side by side relationship, a plurality of carriages mounted on said tracks and movable forwardly and rearwardly thereon, each of said carriages being provided with a skidway, power mechanism individual to each carriage for selectively moving the carriages forwardly and rearwardly, a single power operated boom structure for selectively lifting containers into cooperative relationship with said skidways, each of said carriages with its associated skidway being movable forwardly of the frame to a position wherein a container on the skidway may be deposited for support entirely by said frame, and supporting members for the containers mounted on said frame to provide forwardly inclined supporting surfaces for the containers.

5. In a transporting and dumping equipment adapted to be mounted on a truck chassis, the combination of a frame providing a plurality of tracks in side by side relationship, a plurality of carriages mounted on said tracks and movable forwardly and rearwardly thereon, each of said carriages being provided with a skidway, power mechanism individual to each carriage for selectively moving the carriages forwardly and rearwardly, and a single power operated boom structure for selectively lifting containers into cooperative relationship with said skidways, each of said skid frames being individually provided with means for automatically suspending a container therefrom.

6. In a transporting and dumping equipment adapted to be mounted on a truck chassis, the combination of a frame providing a plurality of tracks in side by side relationship, a plurality of carriages mounted on said tracks and movable forwardly and rearwardly thereon, each of said carriages being provided with a skidway, power mechanism individual to each carriage for selectively moving the carriages forwardly and rearwardly, and a single power operated boom structure for selectively lifting containers into cooperative relationship with said skidways, said boom structure being provided with means for attaching different forms of containers thereto.

7. In a transporting and dumping equipment adapted to be mounted on a truck chassis, the combination of a base frame adapted to be carried by the chassis, a plurality of means extending forwardly of the rear end of said frame and in side by side relationship for separately and individually handling a plurality of containers, and a single means common to said last-named means for moving containers into and out of cooperative relationship with said handling means.

8. In a transporting and dumping equipment adapted to be mounted on a truck chassis, the combination of a base frame adapted to be carried by the chassis, a plurality of carriages mounted on said frame to move forwardly and rearwardly of said frame and in side by side relationship for separately and individually handling separate containers, means for moving said carriages independently of each other forwardly and rearwardly with respect to said base frame, and a single means common to said carriages for moving containers into and out of cooperative relationship with said carriages.

9. In a transporting and dumping equipment adapted to be mounted on a truck chassis, the combination of a base frame adapted to be carried by the chassis, a plurality of carriages mounted on said frame to move forwardly and rearwardly of said frame and in side by side relationship, a skidway mounted on each carriage, power mechanism individual to each carriage for independently moving the respective carriages forwardly and rearwardly with respect to said base frame, and a single means common to said carriages for moving containers into and out of cooperative relationship with said skidways.

10. In a transporting and dumping equipment adapted to be mounted on a truck chassis, the combination of a base frame adapted to be carried by the chassis, a plurality of carriages movably mounted on said frame for movement forwardly and rearwardly on said frame, power mechanism for independently moving each carriage forwardly and rearwardly, and boom means common to said carriages for moving containers into operative relationship with the respective carriages.

11. In a transporting and dumping equipment adapted to be mounted on a truck chassis, the combination of a base frame adapted to be carried by the chassis, a plurality of carriages movably mounted on said frame for movement forwardly and rearwardly on said frame, power mechanism for independently moving each carriage forwardly and rearwardly, and boom means for moving containers into operative relationship with the respective carriages, said boom means including a single boom structure operable to move containers into operative relationship with either or both of said carriages.

12. In a transporting and dumping equipment adapted to be mounted on a truck chassis, the combination of a base frame adapted to be carried by the chassis, a plurality of carriages movably mounted on said frame for forward and rearward movement on said frame, power mechanism for independently moving each carriage forwardly and rearwardly, and boom means common to said carriages for moving containers into operative relationship with the respective carriages, said boom means including arms adapted to embrace containers mounted on said base frame to prevent lateral displacement thereof.

13. In a transporting and dumping equipment adapted to be mounted on a truck chassis, the combination of a base frame adapted to be carried by the chassis, a plurality of carriages movably mounted on said frame for forward and rearward movement on said frame, power mechanism for independently moving each carriage forwardly and rearwardly, and boom means for moving containers into operative relationship with the respective carriages, said boom means including a pivotally mounted boom structure and power mechanism for raising and lowering said structure with respect to said base frame.

14. In a transporting and dumping equipment adapted to be mounted on a truck chassis, the combination of a base frame adapted to be carried by the chassis, a plurality of carriages movably mounted on said frame for forward and rearward movement on said frame, power mechanism for independently moving each carriage forwardly and rearwardly, and boom means for moving containers into operative relationship with the respective carriages, said boom means including provisions for attaching different types of containers thereto.

15. In a transporting and dumping equipment adapted to be mounted on a truck chassis, the combination of a base frame adapted to be carried by the chassis, a plurality of carriages movably mounted on said frame for forward and rearward movement on said frame, an inclined skidway individual to each carriage, power mechanism for independently moving each carriage forwardly and rearwardly, boom means for moving containers into operative relationship with the respective skidways and carriages, and means providing supporting surfaces for containers on said base frame which are substantially at right angles to said skidways.

16. In a transporting and dumping equipment adapted to be mounted on a truck chassis, the combination of a base frame adapted to be carried by the truck chassis, means providing a plurality of pairs of trackways extending fore and aft with respect to said frame, a carriage mounted on rollers on each pair of trackways and movable fore and aft with respect to said frame, power mechanism individual to each carriage for moving the same forwardly and rearwardly with respect to said frame, and a single power operated boom structure for raising and lowering containers into and out of engagement with said carriages.

17. In a transporting and dumping equipment adapted to be mounted on a truck chassis, the combination of a base frame adapted to be carried by the truck chassis, means providing a plurality of pairs of trackways extending fore and aft with respect to said frame, a carriage mounted on rollers on each pair of trackways and movable fore and aft with respect to said frame, power mechanism individual to each carriage for moving the same forwardly and rearwardly with respect to said frame, a power operated boom structure for raising and lowering containers into and out of engagement with said carriages, said carriages being separately movable forwardly by the engagement of a container therewith, and forwardly inclined supporting surfaces on said frame for receiving said containers when moved into their forward positions.

18. In a transporting and dumping equipment adapted to be mounted on a truck chassis, the combination of a base frame adapted to be carried by the truck chassis, means providing a plurality of pairs of trackways extending fore and aft with respect to said frame, a carriage mounted on rollers on each pair of trackways and movable fore and aft with respect to said frame, power mechanism individual to each carriage for moving the same forwardly and rearwardly with respect to said frame, a power operated boom structure for raising and lowering containers into and out of engagement with said carriages, said carriages being separately movable forwardly by the engagement of a container therewith, and forwardly inclined supporting surfaces on said frame for receiving said containers when moved into their forward positions, said boom structure being movable into a position when said containers are supported on said supporting surfaces for preventing lateral displacement of said containers.

19. In a transporting and dumping equipment adapted to be mounted on a truck chassis, the combination of a base frame adapted to be carried by the truck chassis, means providing a plurality of pairs of trackways extending fore and aft with respect to said frame, a carriage mounted on rollers on each pair of trackways and movable fore and aft with respect to said frame, power mechanism individual to each carriage for moving the same forwardly and rearwardly with respect to said frame, and a power operated boom structure for raising and lowering containers into and out of engagement with said carriages, said boom structure having means for attachment to containers of different construction.

20. In a transporting and dumping equipment adapted to be mounted on a truck chassis, the combination of a base frame adapted to be carried by the truck chassis, means providing a plurality of pairs of trackways extending fore and aft with respect to said frame, a carriage mounted on rollers on each pair of trackways and movable fore and aft with respect to said frame, a boom structure for raising and lowering containers into and out of engagement with said carriages, and means for separately and individually moving said carriages independently of each other and for moving said boom structure to move containers into and out of cooperation with each or all of said carriages.

GEORGE R. DEMPSTER.